United States Patent [19]
Aldridge

[11] 3,838,994
[45] Oct. 1, 1974

[54] CONVERSION OF HEAVY HYDROCARBONS TO A METHANE RICH GAS PRODUCT

[75] Inventor: Clyde L. Aldridge, Baton Rouge, La.

[73] Assignee: Esso Research and Engineering Company, Linden, N.J.

[22] Filed: Dec. 20, 1972

[21] Appl. No.: 316,835

Related U.S. Application Data

[63] Continuation-in-part of Ser. No. 226,254, Feb. 14, 1972, abandoned, which is a continuation-in-part of Ser. No. 125,581, March 18, 1971, abandoned.

[52] U.S. Cl. .................. 48/215, 48/214, 252/373
[51] Int. Cl. ...... C01b 2/14, C01b 2/22, C10g 11/28
[58] Field of Search ....... 48/214, 215, 197; 252/373

[56] References Cited
UNITED STATES PATENTS

| | | | |
|---|---|---|---|
| 2,546,606 | 3/1951 | Mayland | 252/373 |
| 3,252,774 | 5/1966 | McMahon et al. | 48/214 |
| 3,334,055 | 8/1967 | Dowden et al. | 48/214 X |
| 3,379,505 | 4/1968 | Holmes et al. | 23/212 |
| 3,415,634 | 12/1968 | Dent et al. | 48/215 |
| 3,421,871 | 1/1969 | Davies | 48/214 |
| 3,451,949 | 6/1969 | Topsoe et al. | 48/214 X |
| 3,586,621 | 6/1971 | Pitchford et al. | 48/214 X |
| 3,737,291 | 6/1973 | Lhonore | 48/214 |
| 3,740,193 | 6/1973 | Aldridge et al. | 48/214 X |

Primary Examiner—R. E. Serwin

[57] ABSTRACT

Heavy hydrocarbons are converted to a methane rich gas product by contact with steam in the presence of a non-molten particulate alkali metal containing catalyst at pressures greater than 200 psig and average temperatures between 1,000° and 1,500°F.

27 Claims, 2 Drawing Figures

CONVERSION OF HEAVY HYDROCARBONS TO A METHANE RICH GAS PRODUCT

CROSS-REFERENCE TO RELATED APPLICATIONS

This application is a continuation-in-part of Ser. No. 226,254 filed Feb. 14, 1972, now abandoned which is a continuation-in-part of Ser. No. 125,581 filed Mar. 18, 1971, now abandoned.

BACKGROUND OF THE INVENTION

1. Field of the Invention

This invention relates to the conversion of a hydrocarbon feed containing heavy hydrocarbons to a methane rich gas product in the presence of a particulate alkali metal containing catalyst.

2. Description of the Prior Art

The use of alkali metal compounds as catalysts in various hydrocarbon conversion processes is well known. For example, U.S. Pat. No. 2,893,941 discloses the use of a minute quantity of $K_2CO_3$ in a steam cracking process to inhibit coke formation. It is also known (see U.S. Pat. No. 3,112,257) that hydrocarbon oils can be desulfurized by contact with steam in the presence of a Group VI to Group VIII metal-alkali metal catalyst system at temperatures under 900°F. Alkali metal compounds are also known to increase hydrogen production when steam gasifying solid carbonaceous materials (see U.S. Pat. No. 3,252,773) and when coking hydrocarbon oils (see U.S. Pat. No. 3,179,584). It is also known to use minor amounts of alkali metal to stabilize rhenium catalysts used in the production of hydrogen from normally gaseous or normally liquid light hydrocarbons. As disclosed in U.S. Pat. No. 3,252,774, it is further known that light hydrocarbons can be converted to a hydrogen-rich gas stream by contact with steam and a large excess of molten alkali metal catalyst system at low feed rates.

It is also known that methane can be produced by steam reforming naphtha or lighter boiling hydrocarbons in the presence of a steam reforming catalyst. Attempts to steam reform higher boiling hydrocarbon feedstocks with such processes have led to a rapid deactivation of the conventional steam reforming catalysts due to carbon deposition thereon. Furthermore, hydrocarbon feedstocks having large amounts of sulfur contaminants generally require a desulfurization treatment prior to the catalytic steam reforming process since the conventional steam reforming catalysts are sulfur sensitive.

It has now been found that hydrocarbon feed streams comprising at least 10 weight percent hydrocarbons boiling over 600°F. at atmospheric pressure, can be converted into a methane rich gas product at commercially attractive feed rates.

SUMMARY OF THE INVENTION

In accordance with the invention, a hydrocarbon feed containing at least 10 weight percent hydrocarbons having a boiling point above 600°F. at atmospheric pressure, is converted to a methane rich vaporous product by contacting said hydrocarbon feed with steam in a reaction zone containing a particulate catalyst bed comprising an alkali metal component, a solid particulate support and an in-situ formed carbonaceous deposit on said support, wherein the alkali metal component (calculated as the metal) comprises at least 1.0 weight percent of the total solids inventory of said bed, said feed being introduced into said reaction zone at a rate of at least 0.02 weight part of feed per weight part of bed solids inventory per hour and said reaction zone being maintained at a pressure above 200 psig and at an average temperature between about 1,000°F. and 1,500°F. According to one embodiment of the invention, an oxygen-containing gas is introduced into the reaction zone to provide at least a portion of the heat required therein by combustion of at least a portion of the feed and/or carbonaceous materials and/or gaseous product contained therein. In another embodiment of the invention, a portion of catalyst bed solids is withdrawn from the reaction zone and passed to a separate heating zone. Thereafter the heated solids portion is recycled to the reaction zone to provide at least a portion of the heat required therein. According to a further embodiment of the invention, the reaction zone is maintained at pressures as low as at least 50 psig when the temperature is maintained at an average temperature of at least 1,250°F.

PREFERRED EMBODIMENTS OF THE INVENTION

The preferred embodiments of the invention will be described with reference to FIGS. 1 and 2.

The process of this invention is suitable for the conversion of a great variety of hydrocarbon feedstreams containing heavy hydrocarbons and which may further contain contaminants such as sulfur compounds, metals and/or nitrogen compounds. It is suited for the treatment of hydrocarbon feeds containing at least 10 weight percent hydrocarbons boiling above 600°F. at atmospheric pressure and it is especially suited for hydrocarbon feeds containing at least 10 weight percent hydrocarbons having a boiling point greater than 900°F. at atmospheric pressure. By way of example, suitable hydrocarbon feeds include whole petroleum crude; petroleum atmospheric residuum; petroleum vacuum residuum; heavy hydrocarbon oils and other heavy hydrocarbon residua; deasphalted residua; the asphaltene fraction from deasphalting operations; bottoms from catalytic cracking process fractionators; coker produced oils; cycle oils, such as, catalytically cracked cycle oil; pitch, asphalt and bitumen from coal, tar sands or shale; naturally occurring tars, as well as tars resulting from petroleum refining processes; shale oils; tar sand oils which may contain sand; hydrocarbon feedstreams containing heavy or viscous materials including petroleum wax fractions, etc. Furthermore, to any of these suitable hydrocarbon feeds may be added a solid carbonaceous material such as coke or coal.

Figure 1:
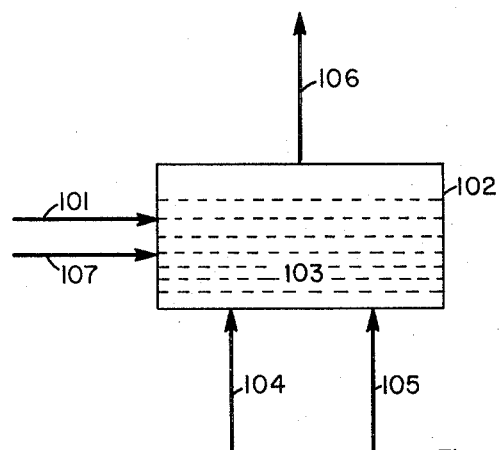
FIG. 1 is a diagrammatic flow plan of one embodiment of the invention.

Referring to FIG. 1, a hydrocarbon feed is introduced via line 101 into a reaction vessel 102 to contact steam in the presence of a particulate alkali metal containing catalyst maintained as a fluid bed 103. Steam is introduced into the reaction zone via line 104. This steam may also serve as a fluidizing gas. The steam rate is set such as to secure practical steam conversion. Desirably, steam is introduced into the reaction zone in amounts such that R, the ratio of molecules of steam to atoms of carbon in the hydrocarbon feed as expressed by the equation:

$$\text{moles of steam introduced/atoms of carbon in feed} = R$$

varies between 0.7 and 15, preferably between 1.7 and 5. An oxygen-containing gas, such as, air or oxygen is introduced into the reaction vessel via line 105 to provide at least a portion of the heat needed in that zone by combustion of at least a portion of the feed and/or the carbonaceous material and/or gaseous products present therein.

The catalyst may be maintained in a fixed, moving or fluid bed. Moving or fluid bed catalyst systems are preferred for conversion of feed materials containing the heaviest hydrocarbons. Because of the ease of maintaining uniform temperature distribution and preventing the formation of coke agglomerates, a fluidized catalyst system is particularly preferred for the conversion of feedstocks containing large amounts of hydrocarbons having a 900°F. plus boiling point at atmospheric pressure.

Catalyst bed 103 is a bed of particulate solids which contains the catalyst, coke by-product, and ash constituents including metal contaminants of the hydrocarbon feed. The catalyst comprises an alkali metal component, a solid particulate material as carrier or support and a solid carbonaceous coating or deposit which is formed in situ on the support when the process is in operation. The active catalytic component is believed to be the alkali metal. The alkali metal component is preferably provided in the catalyst system by either depositing or mixing initially an alkali metal compound with a suitable solid particulate support. This depositing or mixing can be performed within the reaction vessel or outside the reaction vessel with subsequent introduction of the composite into the reaction vessel. Under the process conditions, it is believed that the alkali metal compound is at least partially reduced to the free metallic state.

Suitable alkali metal catalyst components include the carbonates, acetates, formates, sulfides, hydrosulfides, sulfites, vanadates, oxides and hydroxides of sodium, lithium, cesium, and potassium. In general, any alkali metal compound which is at least partially reducible to the free metallic state under process conditions may be used.

The solid particulate support may be chosen from a wide variety of solids. The support may be a gasifiable (at process conditions) solid or a substantially non-gasifiable (at process conditions) solid. Although a gasifiable solid such as coke or activated carbon is suitable as support, a non-gasifiable solid support is preferred because changes of temperature or steam-to-carbon ratios in the reaction zone could result in degradation of the gasifiable support including partial or total loss of the support from the bed and the possible consequent entrainment of alkali metal containing fines out of the reaction zone. The preferred non-gasifiable particulate solid supports include zeolites, refractory inorganic oxides, such as, silica-alumina, zirconia, magnesia, calcium oxide, gamma alumina, crude or partially purified bauxite, alpha alumina, alundum, mullite, silica; synthetically prepared or naturally occurring material such as pumice, clay, diatomaceous earth (kieselguhr); porcelain, glass or marble spheres or other inert spherical materials.

The carbonaceous deposit is formed when the process is in operation. Part of the feed is converted to a solid carbonaceous material, a portion of which deposits on the alkali metal containing support particles present in the reaction zone. While applicant does not wish to be bound by theory, it is believed that at least a portion of the alkali metal migrates to the carbonaceous deposit on the support to form the desired catalyst system.

A preferred catalyst comprises $K_2CO_3$ or $Cs_2CO_3$ mixed with or deposited on a refractory inorganic oxide such as alumina, silica, silica-alumina, magnesia, crude or partially purified bauxite or mixtures thereof. A sufficient amount of alkali metal compound is added to the catalyst bed to maintain at least 1.0 weight percent alkali metal (calculated as the metal) based on the total bed solids inventory (support plus alkali metal compound, solid carbonaceous products, ash, residual metals, etc.) present in the catalyst bed under processing conditions. Preferably, the weight of alkali metal in the bed will range broadly between 1.0 and 35 weight percent (calculated as the metal), more preferably between 3 and 30 weight percent and most preferably between 4 and 25 weight percent. An example of an equilibrium composition of the total solids inventory of the catalyst bed would be about 25 weight percent $K_2CO_3$ (calculated as $K_2CO_3$), 35 weight percent solid support, 20 weight percent coke, 20 weight percent ash derived from impurities of the feed. A portion of the catalyst bed solids may be withdrawn from the reaction zone periodically or continuously to prevent excessive accumulation of ash in the bed. Fresh or regenerated catalyst would then be introduced into the reaction zone to maintain the desired catalyst inventory. The catalyst system exhibits an unusually high cracking activity as well as methane formation activity.

Reaction zone 102 is maintained at a pressure above 200 psig (pounds per square inch gauge), preferably at a pressure between about 250 and 1,500 psig, more preferably at pressures between 400 and 1,000 psig and at a numerically integrated average temperature over the length of the reaction zone between about 1,000° and 1,500°F., preferably at an average temperature between about 1,200° and 1,450°F., more preferably at an average temperature between about 1,250° and 1,425°F. By numercially integrated average temperature is meant the procedure wherein a temperature-distance plot (curve) is averaged by taking the sum of $n$ equally spaced ordinate values of temperature and dividing this sum by $n$.

The reaction zone may also be operated at a pressure as low as 50 psig when the average temperature is at least 1,250°F. to maintain adequate gasification rates.

The rate at which the hydrocarbon feed is fed into the reaction zone will depend in part upon the operating conditions within that zone. Under the above given operating conditions, suitable feed rates are, for example, at least 0.02 weight part of feed per weight part of bed solids inventory per hour, preferably between 0.02 and 1.0 weight part feed per weight part bed solids inventory per hour, more preferably between 0.05 and 0.8 weight part of feed per weight part of bed solids inventory, most preferably between 0.1 and 0.5 weight part feed per weight part bed solids inventory per hour.

Because the reaction of steam with carbon to produce a methane rich vaporous product under the above given conditions is an overall endothermic reaction, at least a portion of the heat required in the reaction zone is provided by injecting small quantities of an oxygen-containing gas such as air or oxygen into the bottom of the reaction zone via line 105. Instead of injecting the oxygen-containing gas separately into the bottom of the reaction zone, it could be injected with the steam via line 104. It may be necessary to provide additional heat into the system. A preferred method would be to inject additional small quantities of an oxygen-containing gas at other points along the length of the reaction vessel such as, for example, via line 107 for better heat distribution.

The reaction of the oxygen-containing gas with the carbonaceous material present in the reaction zone produces the following highly exothermic reaction:

$$C + O_2 \rightarrow CO_2 + 169200 \text{ Btu}$$

Other methods of providing additional heat into the reaction zone include preheating the hydrocarbon feed and/or preheating the steam. Another method of providing additional heat is to withdraw a portion of the catalyst bed solids from the reaction zone and pass it to a separate heating zone and then to recycle the heated solids portion to the reaction zone. A still further method of providing additional heat is to include electrical heating means within the catalyst bed or other indirect methods of heating the bed. Furthermore, any combination of each of these methods can also be employed.

When the hydrocarbon feed is introduced into the reaction vessel, a number of reactions occur. A portion of the feed is cracked to hydrocarbon products of lower boiling point than the feed, including methane, and into solid carbonaceous material. A portion of the lower boiling hydrocarbons and the solid carbonaceous material react with the steam in the catalytic bed and undergo steam reforming and gasification reactions to produce methane, $H_2$, CO and $CO_2$. The reactions occurring within the reaction vessel result in the formation of a vaporous product which comprises methane, hydrogen, carbon monoxide, carbon dioxide, and unreacted steam. Depending on the hydrocarbon feed used, the vaporous product may also contain light hydrocarbon products other than methane. These other light hydrocarbon products may include $C_2$ to $C_4$ normally gaseous hydrocarbon products and a minor amount of normally liquid hydrocarbons which are predominantly aromatics, such as, benzene and toluene. Tar production is substantially inhibited. The methane rich vaporous product is removed from the reaction zone via line 106.

In another embodiment of the invention, the methane-rich product removed from the reaction zone can be treated (e.g., by condensation) to remove unreacted steam and any of the normally liquid hydrocarbons which may be present. At least a portion of the remaining stream consisting primarily of methane, hydrogen, carbon dioxide and carbon monoxide can then be recycled to the reaction zone. This procedure has several advantages. For example, some of the $H_2$, $CO_2$, and CO may be converted to additional methane as follows:

$$3H_2 + CO \rightarrow CH_4 + H_2O$$

$$4H_2 + CO_2 \rightarrow CH_4 + 2H_2O$$

If desired, the $CO_2$ may also be removed from the stream by conventional means and/or methane may be removed before the stream is recycled to the reaction zone.

In another embodiment, the normally liquid hydrocarbon products (mostly aromatics) are separated from the vaporous product stream. Part or all of the liquid products may be recycled to the reaction zone, if desired, to extinction.

Figure 2:
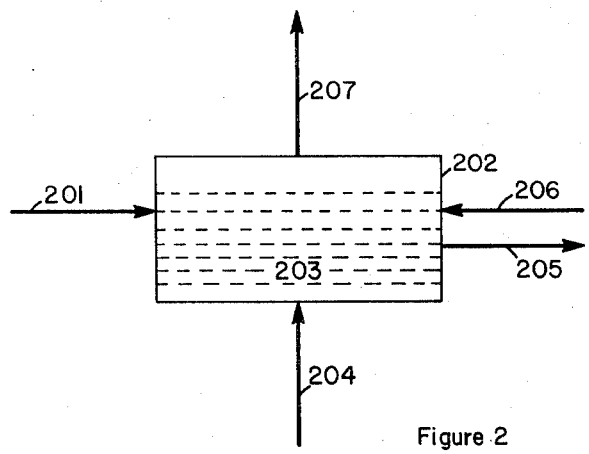
FIG. 2 is a diagrammatic flow plan of another embodiment of the invention.

The embodiment shown in FIG. 2 is similar to that shown in FIG. 1 with the following exceptions. An oxygen-containing gas is not introduced into the reaction vessel to provide any portion of the heat requirement. At least a portion of the heat is supplied to the reaction vessel by withdrawing a portion of the solids from catalyst bed 203 via line 205, passing this portion to a separate heating zone (not shown), which may be an air burner, and recycling the resulting heated solids portion to the bed via line 206. The hydrocarbon feed is introduced via line 201 into reaction vessel 202 which contains a particulate catalytic bed 203. Steam is introduced via line 204. The methane rich vaporous product is removed via line 207. As previously described for the embodiment of FIG. 1, a small portion of the bed solids may be purged from the reaction zone to prevent excessive ash build up.

The following examples are illustrative of various embodiments of the invention.

EXAMPLE 1

A Safaniya vacuum residuum, having a 1,000°F. + initial boiling point at atmospheric pressure, was fed into a reactor vessel containing a fluid bed of catalyst comprising silica-alumina and 7.3 weight percent potassium (calculated as the metal) based on the total solids of the bed, at a rate of 0.22 weight part of residuum per weight part of bed solids inventory per hour. The reactor vessel had a height of 23 feet and an inside diameter of 4 inches. The weight of total bed solids inventory was 31.85 pounds. The bed height was 6.2 feet. There the residuum was contacted with steam introduced into the bottom of the reactor bed at a rate of 1.1 weight part of steam per weight part of bed solids inventory per hour i.e., 3.93 weight parts of steam per weight part of residuum, under conditions to achieve a 22.8 weight percent of inlet steam conversion (as measured by exit gas composition) i.e., 1,409°F., 302 psig and at a superficial velocity of 0.43 foot per second. This operation was continued for 6 hours. The resulting gaseous product stream (after condensation of steam) had the following composition as determined by mass spectroscopic analysis:

| Component | Mole % |
|---|---|
| $H_2$ | 53.2 |
| $CH_4$ | 10.8 |
| $N_2$ | 6.01 |
| CO | 4.38 |
| $CO_2$ | 22.05 |
| $H_2S$ | 1.23 |
| $H_2O$ | 0.18 |
| $C_2+$ | 2.15 |

The presence of nitrogen in the above given gaseous product was due to the introduction of extraneous nitrogen into the reaction vessel under the given operation procedures.

The $C_2+$ comprised the following components as analyzed by mass spectroscopic analysis.

| Component | Weight % |
|---|---|
| $C_2H_4$ | 1.72 |
| $C_2H_6$ | 26.69 |
| $C_3H_6$ | — |
| $C_3H_8$ | — |
| $C_4H_8$ | — |
| $C_4H_{10}$ | — |
| $C_5H_{12}$ | — |
| $C_6H_6$ | 11.14 |
| $C_7H_8$ | 0.78 |
| Unknown | 59.66 |
| Total | 99.99 |

EXAMPLE 2

In a procedure similar to Example 1, the same feedstock was introduced into a reactor vessel containing a fluid bed of catalyst comprising silica-alumina and 6.6 weight percent potassium (calculated as the metal) based on the total solids of the bed, at a rate of 0.18 weight part of residuum per weight part of bed solids inventory per hour. The reactor vessel had a height of 23 feet and an inside diameter of 3 inches. The weight of total bed solids inventory was 25.03 pounds. The bed height was 7.5 feet. The residuum was contacted with steam introduced into the bottom of the reactor bed at a rate of 1.15 weight part of steam per weight part of bed solids inventory per hour, i.e., 6.30 weight parts of steam per weight part of residuum under conditions to achieve a 13.3 weight percent of inlet steam conversion (as measured by exit gas composition) that is, 1,378°F., 425 psig, and at a superficial velocity of 0.5 foot per second. This operation was continued for 8 hours. The resulting gaseous product stream (after condensation of steam) had the following composition as determined by gas chromatographic analysis:

| Component | Mole % |
|---|---|
| $H_2$ | 42.88 |
| $CH_4$ | 13.24 |
| $N_2$ | 7.33 |
| $CO$ | 3.11 |
| $CO_2$ | 28.70 |
| $H_2S$ | 1.47 |
| $H_2O$ | 0.09 |
| $C_2+$ | 3.18 |

The $C_2+$ comprised the following components as analyzed by mass spectroscopic analysis.

| Component | Weight % |
|---|---|
| $C_2H_4$ | 2.22 |
| $C_2H_6$ | 32.30 |
| $C_3H_6$ | 1.05 |
| $C_3H_8$ | 0.26 |
| $C_4H_8$ | — |
| $C_4H_{10}$ | 0.01 |
| $C_5H_{12}$ | 0.01 |
| $C_6H_6$ | 7.86 |
| $C_7H_8$ | 0.58 |
| Unknown | 55.71 |
| Total | 100.00 |

EXAMPLE 3

In a procedure similar to Example 1, the same feedstock was introduced into a reactor containing a fluid bed comprising coke and 6.4 weight percent of potassium (calculated as the metal) based on the total solids of the bed, at a rate of 0.22 weight part of residuum per weight part of bed solids inventory per hour. The reactor vessel had a height of 23 feet and an inside diameter of 4 inches. The bed height was 5.7 feet. The weight of total bed solids inventory was 26.5 pounds. There the residuum was contacted with steam introduced into the bottom of the reactor bed at a rate of 0.894 weight part steam per weight part of bed solids inventory per hour i.e., 4.1 weight part of steam to weight part of residuum, under conditions to achieve a 34.6 weight percent of inlet steam conversion (as measured by exit gas composition), that is, 1,266°F., 220 psig and at a superficial velocity of 0.35 foot per second. This operation was continued for 2 hours. The resulting gaseous product stream (after condensation of steam) had the following composition as determined by mass spectroscopic analysis:

| Component | Mole % |
|---|---|
| $H_2$ | 47.31 |
| $CH_4$ | 9.22 |
| $N_2$ | 5.09 |
| $CO$ | 6.70 |
| $CO_2$ | 22.37 |
| $H_2S$ | 1.40 |
| $H_2O$ | 3.20 |
| $C_2+$ | 4.71 |

The $C_2+$ comprised the following components as analyzed by mass spectroscopic analysis:

| Component | Weight % |
|---|---|
| $C_2H_4$ | 7.30 |
| $C_2H_6$ | 44.93 |
| $C_3H_6$ | 7.55 |
| $C_3H_8$ | 10.78 |
| $C_4H_8$ | 2.23 |
| $C_4H_{10}$ | 2.16 |
| $C_5H_{12}$ | 0.45 |
| $C_6H_6$ | 4.08 |
| $C_7H_8$ | 0.59 |
| Unknown | 19.92 |
| Total | 99.99 |

EXAMPLE 4

In a procedure similar to Example 1, the same feedstock was introduced into a reactor vessel containing a fluid bed of catalyst comprising Porocel (registered trademark name of Attapulgus Clay Co. for bauxite) and 5.7 weight percent potassium (calculated as the metal) based on the total solids of the bed, at a rate of 0.10 weight residuum per weight of bed solids inventory per hour. The reactor had a height of 23 feet and an inside diameter of 3 inches. The weight of total bed solids inventory was 32.96 pounds. The height of the bed was 11.9 feet. There the residuum was contacted with steam introduced into the bottom of the reactor at a rate of 0.931 weight part steam per weight part of bed solids inventory i.e., 9.76 weight parts steam per weight part residuum, under conditions to achieve an 8.3 weight percent of inlet steam conversion (as measured by exit gas composition), that is, 1,376°F., 425 psig and at a superficial space velocity of 0.46 foot per second. This operation was continued for 2.5 hours. The resulting gaseous product stream (after condensation of steam) had the following composition as determined by mass spectroscopic analysis:

| Component | Mole % |
|---|---|
| $H_2$ | 38.08 |
| $CH_4$ | 17.63 |
| $N_2$ | 5.17 |
| $CO$ | 2.04 |
| $CO_2$ | 29.16 |
| $H_2S$ | 1.87 |
| $H_2O$ | 0.11 |
| $C_2+$ | 5.94 |

The $C_2+$ comprised the following components as analyzed by mass spectroscopic analysis:

| Component | Weight % |
|---|---|
| $C_2H_4$ | 4.88 |
| $C_2H_6$ | 41.65 |
| $C_3H_6$ | 2.15 |
| $C_3H_8$ | 1.88 |
| $C_4H_8$ | — |
| $C_4H_{10}$ | 0.51 |
| $C_5H_{12}$ | — |
| $C_6H_6$ | 5.33 |
| $C_7H_8$ | 0.51 |
| Unknown | 43.09 |
| Total | 100.00 |

What is claimed is:

1. A process for producing a methane-rich vaporous product by converting a hydrocarbon feed containing at least 10 weight percent hydrocarbons having a boiling point above 900°F. at atmospheric pressure, which comprises contacting said feed with steam and an oxygen-containing gas in a reaction zone containing a particulate catalyst bed comprising an alkali metal component, a solid particulate support and an in-situ formed carbonaceous deposit on said support, wherein said alkali metal component (calculated as the metal) comprises at least 1.0 weight percent of the total solids inventory of said bed, said feed being introduced into said reaction zone at a rate of at least 0.02 weight part of feed per weight part of bed solids inventory per hour and said reaction zone being maintained at a pressure above 200 psig and at an average temperature between 1,000° and 1,500°F.

2. The process of claim 1 wherein the weight of said alkali metal component (calculated as the metal) is between 1.0 and 35 weight percent of the total solids inventory of said bed.

3. The process of claim 1 wherein the weight of said alkali metal component (calculated as the metal) is between 3 and 30 weight percent of the total solids inventory of said bed.

4. The process of claim 1 wherein the weight of said alkali metal component (calculated as the metal) is between 4 and 25 weight percent of the total solids inventory of said bed.

5. The process of claim 1, wherein said alkali metal component is an alkali metal compound which is at least partially reducible to the free metal.

6. The process of claim 1 wherein said hydrocarbon feed is introduced into said reaction zone at a rate between 0.02 and 1.00 weight part feed per weight part of total bed solids inventory per hour.

7. The process of claim 1 wherein said solid support is a non-gasifiable material.

8. The process of claim 1 wherein said solid support is a refractory inorganic oxide.

9. The process of claim 1 wherein said solid support is an inorganic oxide selected from the group consisting of silica, alumina, silica-alumina, magnesia, crude or partially purified bauxite or mixtures thereof.

10. The process of claim 1 wherein said solid support is activated carbon.

11. The process of claim 1 wherein said solid support is petroleum coke.

12. The process of claim 1 wherein said catalyst comprises $K_2CO_3$ or $Cs_2CO_3$ deposited on or mixed with said solid support.

13. The process of claim 1 wherein said methane-rich vaporous product is treated to remove unreacted steam and at least a portion of the remaining stream is recycled to the reaction zone.

14. The process of claim 1 wherein said methane-rich vaporous product is treated to remove unreacted steam and $CO_2$ and at least a portion of the remaining product is recycled to said reaction zone.

15. The process of claim 14 wherein the $CO_2$-removed product is further treated to separate normally gaseous products from normally liquid hydrocarbon products and wherein at least a portion of said liquid products is recycled to said reaction zone.

16. The process of claim 14 wherein the $CO_2$-removed product is further treated to remove methane and at least a portion of the remaining methane-removed product is recycled to said reaction zone.

17. The process of claim 1 wherein said reaction zone is maintained at a pressure between about 250 and 1,500 psig.

18. The process of claim 1 wherein said reaction zone is maintained at a pressure between about 400 and 1,000 psig.

19. The process of claim 1 wherein a portion of said particulate catalyst bed is withdrawn from said reaction zone and passed to a separate heating zone to heat said portion and wherein the resulting heated portion is recycled to the reaction zone to provide a portion of the heat required therein.

20. The process of claim 1 wherein said hydrocarbon feed comprises a petroleum residuum.

21. The process of claim 1 wherein said catalyst bed is a fluidized bed.

22. A process for producing a methane rich vaporous product by converting a hydrocarbon feed containing at least 10 weight percent hydrocarbons having a boiling point above 900°F. at atmospheric pressure, which comprises contacting said feed with steam and an oxygen-containing gas in a reaction zone containing a particulate catalyst bed comprising an alkali metal component, a solid particulate support and an in-situ formed carbonaceous deposit on said support, wherein said alkali metal component (calculated as the metal) comprises between 4 and 25 weight percent of the total solids inventory in said bed, said feed being introduced into said reaction zone at a rate between 0.02 and 1 weight part feed per weight part bed solids inventory per hour and said reaction zone being maintained at a pressure between about 400 and 1,000 psig and at an average temperature between about 1,250° and 1,425°F.

23. A process for producing a methane rich vaporous product by converting a hydrocarbon feed containing at least 10 weight percent of hydrocarbons having a boiling point above 900°F. at atmospheric pressure, which comprises contacting said feed with steam and an oxygen-containing gas in a reaction zone containing a particulate catalyst bed comprising an alkali metal component, a non-gasifiable solid particulate support and an in-situ formed carbonaceous deposit on said support, wherein said alkali metal component comprises at least 1.0 weight percent of the total solids inventory of the bed, said feed being introduced into said reaction zone at a rate of at least 0.02 weight part of feed per weight part of bed solids inventory per hour and said reaction zone being maintained at a pressure of at least 50 psig and an average temperature in the range between about 1,250° and 1,425°F.

24. The process of claim 23 wherein the weight of alkali metal component (calculated as the metal) is between 4 and 25 weight percent of the total solids inventory of said bed.

25. A process for producing a methane rich vaporous product by converting a hydrocarbon feed containing at least 10 weight percent of hydrocarbons having a boiling point above 900°F. at atmospheric pressure, which comprises:
   a. contacting said feed with steam in a reaction zone containing a particulate catalyst bed comprising an alkali metal component, a solid particulate support and an in-situ formed carbonaceous deposit on said support, wherein said alkali metal component comprises at least 1.0 weight percent of the total solids inventory of said bed, said feed being introduced into said reaction zone at a rate of at least 0.02 weight part of feed per weight part of bed solids inventory per hour and said reaction zone being maintained at a pressure above 200 psig and at an average temperature between about 1,000° and 1,500°F.;
   b. withdrawing a portion of said catalyst bed from said reaction zone;
   c. passing said portion of catalyst bed to a separate heating zone to heat said portion, and
   d. recycling the resulting heated catalyst portion to the reaction zone to provide at least a portion of the heat required in that zone.

26. A process for producing a methane rich vaporous product by converting a petroleum residuum with steam and an oxygen-containing gas in a reaction zone containing a fluidized particulate catalyst bed comprising an alkali metal component, a solid particulate support and an in-situ formed carbonaceous deposit on said support, wherein said alkali metal component (calculated as the metal) comprises between 1.0 and 35 weight percent of the total solids inventory of said bed, said residuum being introduced into said reaction zone at a rate of at least 0.02 weight part of residuum per weight part of bed solids inventory per hour and said reaction zone being maintained at a pressure between about 250 and 1,500 psig and at an average temperature between about 1,000° and 1,500°F.

27. A process for producing a methane rich vaporous product by converting a hydrocarbon feed containing at least 10 weight percent hydrocarbons having a boiling point above 600°F. at atmospheric pressure, which comprises contacting said feed in a reaction zone containing a bed of solids comprising a particulate catalyst consisting essentially of an alkali metal component, a solid particulate support and an in-situ formed carbonaceous deposit on said support, wherein said alkali metal component (calculated as the metal) comprises at least 1.0 weight percent of the total solids inventory of said bed, said feed being introduced into said reaction zone at a rate of at least 0.02 weight part of feed per weight part of bed solids inventory per hour and said reaction zone being maintained at a pressure above 200 psig and at an average temperature between about 1,000° and 1,500°F.

* * * * *